United States Patent [19]

Axman et al.

[11] Patent Number: 5,448,372
[45] Date of Patent: Sep. 5, 1995

[54] STORAGE AND RETRIEVAL OF DIGITIZED PHOTOGRAPHIC IMAGES

[75] Inventors: Michael S. Axman, W. Henrietta; Michael J. Barry; Michael S. Mathieu, both of Rochester, all of N.Y.; Jozef Timmermans, Bilsen, Belgium; Norman Richards, Horsham, England

[73] Assignee: Eastman Kodak Company, Rochester, N.Y.

[21] Appl. No.: 809,365

[22] Filed: Dec. 18, 1991

[51] Int. Cl.⁶ .......................................... H04N 5/781
[52] U.S. Cl. ........................ 358/342; 358/311; 358/335; 358/403; 358/488; 360/13; 348/96
[58] Field of Search .......... 358/342, 335, 214, 311, 358/403, 488; 360/33.1, 13; 348/97, 96

[56] References Cited

U.S. PATENT DOCUMENTS

| | | | |
|---|---|---|---|
| 4,985,784 | 1/1991 | Tsuboi et al. | 358/342 |
| 5,051,835 | 9/1991 | Bruehl et al. | 358/311 |
| 5,157,482 | 10/1992 | Cosgrove | 358/214 |
| 5,177,610 | 1/1993 | Wilkinson | 358/140 |
| 5,218,455 | 6/1993 | Kristy | 358/403 |
| 5,270,831 | 12/1993 | Parulski et al. | 358/403 |

FOREIGN PATENT DOCUMENTS

61-80695  4/1986  Japan .

Primary Examiner—Howard W. Britton
Assistant Examiner—Khoi Truong
Attorney, Agent, or Firm—Edward Dugas

[57] ABSTRACT

A storage and retrieval mechanism for a digital image processing system employs a reduced capacity frame store in the playback device. A plurality of photographic images captured on a photographic recording medium are digitized for processing and subsequent display. Digitized images are stored on a compact disc. When the disc is inserted into a playback device for driving a color TV monitor, the playback device decodes header information representative of image orientation, so that the image will be read from the disc and stored in the reduced capacity frame store for subsequent read out and display in an upright orientation. A memory control mechanism employs a decimation/interpolation operator to interface the imagery data from the disc to the frame store.

71 Claims, 3 Drawing Sheets

STORAGE AND RETRIEVAL OF DIGITIZED PHOTOGRAPHIC IMAGES

FIELD OF THE INVENTION

The present invention relates in general to digitized image data processing systems and is particularly directed to a mechanism for controlling the manner in which digitized images are stored in and retrieved from a playback apparatus' frame store (random access memory), the storage capacity of which is less than the resolution of the digitized image.

BACKGROUND OF THE INVENTION

Digital imaging systems, such as those employed for converting still color photographic film (e.g. 35 mm) images into digital format for storage in a digital database and subsequent playback, as by way of a color television monitor, customarily encode the output of an electronic film scanning device, such as a digital color camera, to some prescribed resolution and store the encoded image in an associated database as a respective image file. When it is desired to display a particular stored image, the contents of the respective addresses of the database in which the digitized image has been stored are read out and coupled to display driver circuitry for energizing corresponding pixels on the TV monitor.

Because each frame of a typical roll of 35 mm film has different horizontal and vertical frame dimensions, for example a dimension of 36 mm in the horizontal direction, parallel to the lengthwise direction of the film, and a dimension of 24 mm in the vertical direction, orthogonal to the lengthwise direction of the film (a horizontal:-vertical aspect ratio of 3:2), a photographer often rotates the camera ninety degrees about the lens axis in order to capture a subject in what is conventionally referred to as a 'vertical' orientation. 'horizontally shot' image, then, when a 'vertically shot' image is displayed, it will be rotated unless the recording and playback system has been designed to accommodate vertical images.

One conventional approach to handle the problem, similar to that described in the Ohta U.S. Pat. No. 4,641,198, is to rotate those film frames which contain vertical images by ninety degrees before scanning and to fill in the left and right sides of the image with a uniform 'border' color (e.g. black). Although this scanning method will provide the proper orientation of the displayed image, it suffers from two drawbacks. First, the actual scanning mechanism must be modified to effect an orthogonal scan of a vertical image. This is traditionally accomplished by physically reorienting the film by ninety degrees and changing the lens magnification of the scanning device by an amount related to the frame aspect ratio. Secondly, since side borders, which contain no useful information in terms of the captured image, are also recorded, some of the information storage capacity of the recording medium is wasted. A second solution to the problem is to rotate the display device, which is obviously impractical in many applications.

A third solution is to allow for different image orientations to be stored, together with digital control data indicating the orientations of the images, and to use an image playback device designed to read the orientation control data to properly orient the images on playback. Some prior art computer image file formats, for example the Tag Image File Format (TIFF), Revision 5.0, developed jointly by Aldus Corporation, Seattle, Wash., and Microsoft Corporation, Redmond, Wash., and described in "An Aldus/Microsoft Technical Memorandum:8/8/88," include the provision for an optical "tag" which can be used to indicate the orientation of the image. Page 25 of the above-mentioned TIFF document, described the TIFF "Orientation" tag, which can have eight different values indicating whether the zeroth row and zeroth column of the pixel data matrix represents the top and left, the top and right, the bottom and right, bottom and left, left and top, right and top, right and bottom, of left and bottom of the visual image. However, the above-mentioned memo further states that this field is recommended for private (non-interchange) use only. The default condition, where the zeroth row represents the visual top of the image, and zeroth column of the pixel data matrix represents the visual left hand side of the image, is recommended for all "non-private" applications, including those involving importing and printing. Thus, the TIFF orientation tag is never used to re-orient for display images which have been stored in different orientations in an image database.

In addition to the problem of different image orientations, captured images may have different aspect ratios. For example, dedicated use panoramic cameras, such as the Kodak Stretch (Trademark) camera, have an aspect ratio of 3:1, which is considerably wider than the above-referenced 3:2 aspect ratio of conventional 35 mm cameras. Other camera types, such as those which employ 126 type film also have aspect ratios other than 3:2.

In accordance with the invention described in co-pending patent application Ser. No. 022,603, filed Sep. 14, 1990, entitled "Mechanism for Controlling Presentation of Displayed Image, " by K. Parulski et al, assigned to the assignee of the present application, and the disclosure of which is incorporated herein, rather than employ a complex and costly hardware arrangement that physically rotates the film scanner relative to the film for non-upright horizontal images (e.g. vertical images), each image is digitized and stored on a digital data storage medium, such as a 'write once' compact disc, in the same orientation as it is captured on film. In addition, a 'presentation' header is annexed to each image file. This header, which is prepared by a photofinishing minilab operator who views the output of the film scanner, is formatted to contain a set of orientation and aspect ratio codes that indicate how the image has been captured on film and, correspondingly, how it is stored on the disc. Subsequently, when the disc is inserted into a playback device, such as a CD player, which drives an output display such as a color TV monitor, the playback device decode presentation control file information, and controls the presentation of the image such that the image is displayed in an upright orientation and at the correct aspect ratio for the display.

Figure 1:
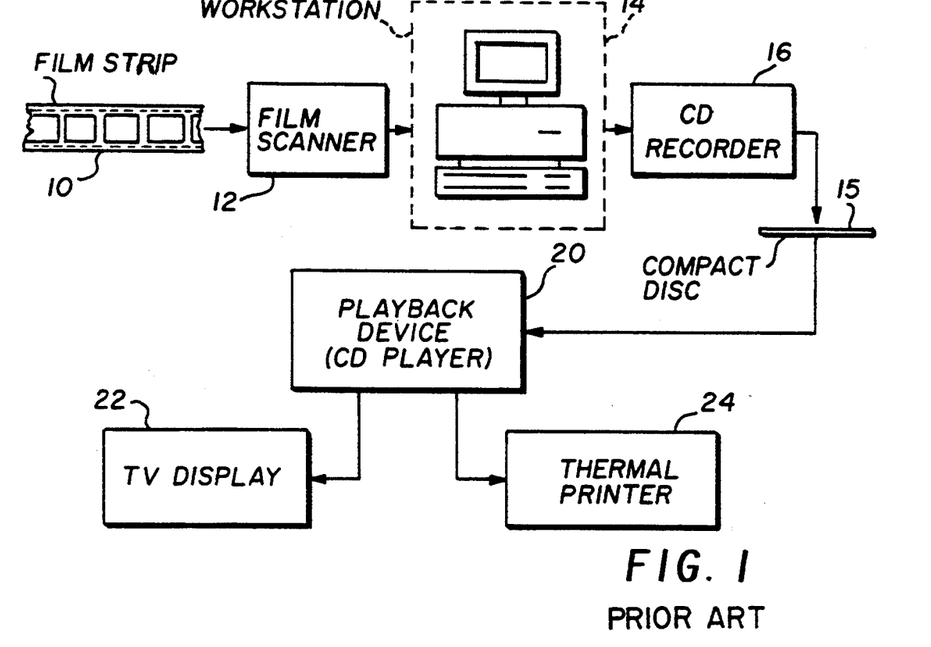
FIG. 1 diagrammatically illustrates a photographic color film processing system in which the present invention may be employed.

FIG. 1 diagrammatically illustrates a digital image system for a photoprocessing mini-lab, in which photographic images, such as a set of twenty-four or thirty-six 36 mm×24 mm image frames of a 35 mm film strip 10, are scanned by a high resolution opto-electronic film scanner 12, such as a commercially available Eikonix 1435 scanner. High resolution scanner 12 outputs digitally encoded data representative of the response of each of the pixels of its high resolution imaging sensor pixel array (e.g. a 3072×2048 pixel matrix). Typically, the color response of each pixel may be resolved into eight bits per color, so that, for a three color sensor array, the response of each sensor pixel is encoded into twenty-four bits. This digitally encoded data, or 'digitized' image, is coupled in the form of an imaging pixel array-representative bit map to an attendant photofinishing workstation 14, which contains a frame store and image processing application software through which the digitized image may be processed (e.g. enlarged, cropped, subjected to a scene balance correction mechanism, etc.) to achieve a desired base image appearance. Once the base image has been prepared, it is to be written onto a transportable medium, such as a write once optical compact disc 15, using an optical compact disc recorder 16, for subsequent playback by a disc player 20, which allows the image to be displayed, for example, on a television set 22, or printed as a finished color print, as by way of a high resolution thermal color printer 24.

Advantageously, the imaging system described in the above referenced co-pending application takes advantage of the imaging mechanism described in U.S. Pat. No. 4,969,204, entitled "Hybrid Residual-Based Hierarchical Storage and Display Method for High Resolution Digital Images in a Multiuse Environment," by Paul W. Melynchuck et al, assigned to the assignee of the present application and the disclosure of which is herein incorporated. Pursuant to that system, each high resolution captured image is stored as a respective image data file containing a low, or base, resolution image bit map file and a plurality of higher resolution residual images associated with respectively increasing degrees of image resolution. By iteratively combining these higher resolution residual images with the base resolution image, successively increased resolution images may be recovered from the base resolution image for application to a high resolution reproduction device.

In order to accommodate data values representative of a scanned 36 mm-by-24 mm image frame of a 35 mm film strip, an original high resolution (3K×2K) image may be decimated into an image data file made up of a base resolution digitized image of 768×512 pixels of luminance information (and an associated 384×256 pixels of two records of chrominance information, set of residual image files). Pursuant to a preferred image processing operator, the base resolution file is formatted to consist of luminance and chrominance information interleaved in the following manner. Since there are twice as many lines of luminance as chrominance, one line of chrominance is interleaved with two lines of luminance, such that the resulting file has the structure of 768 pixels of luminance, 384 pixels of chrominance record one, 384 pixels of chrominance record two, and 768 pixels of luminance.

For the above-referenced file, the total memory capacity required for the base image is 0.5625 megabytes, so that the frame store and its associated read/write circuitry (including the need for separate line and pixel clocks) within the playback device becomes a significant cost item in the overall architecture of the CD player.

SUMMARY OF THE INVENTION

In accordance with the present invention, the size and cost of the digitized imagery data storage and retrieval scheme described above can be reduced by employing, within the playback device, a frame store that has both a smaller capacity and employs a common address clock to play back both horizontally and vertically oriented images. For example, rather than employ a 512×768 luminance capacity memory (which is more than sufficient to fully utilize the bandwidth of a typical NTSC TV display), the playback mechanism uses a frame store the storage capacity of which corresponds to a 'square' pixel array (e.g. a 512×512 luminance resolution), so that the same address clock can be used for both pixel and line scans. To accommodate differences among frame store capacity, disc resolution and display resolution, during memory write operations imagery data values are controllably subjected to an interpolation/decimation operator.

Just as in the above-referenced Parulski et al invention, the present invention incorporates, within a presentation control file associated with each digitized image, additional orientation and aspect ratio information to indicate how the image was captured on film and has been correspondingly digitized and stored on the disc, so that, when played back, the image may have an upright orientation and the correct aspect ratio for the display device. However, unlike the Parulski et al system, because the present invention employs a reduced capacity frame store within the playback end of the system, the manner in which it responds to the presentation control data to control the interfacing of the image data file between the disc and the frame store is different and involves the use of an orientation-dependent decimation/interpolation operator.

More particularly, just as in the Parulski et al application, the present invention is directed to an improved storage and retrieval mechanism for a digital image processing system wherein a plurality of photographic images that have been captured on a photographic recording medium (film strip) are digitized for processing and subsequent reproduction. The film strip can be expected to include both horizontally-shot (whether upright or inverted) and vertically-shot (in either a right or left hand rotation) images. Digitized images are stored on a digital data storage recording medium, such as an optical compact disc, which is capable of being coupled to an image playback device (CD player) for reproduction (e.g. displayed on a color TV monitor).

In a photoprocessing workstation (photofinishing minilab), each (36 mm×24 mm) frame on the (35 mm) film strip is scanned and digitized as though the image were horizontally oriented, irrespective of its actual orientation within the frame. The digitized image is entered into a workstation frame store and displayed on a display monitor, so that the image may be viewed by the operator. Using an input device (e.g. keyboard, mouse) the operator may then enter a set of 'presentation' control codes that are incorporated within a presentation control file associated with a respective image file. These control codes preferably include a first digital code representative of the orientation in which the image is currently displayed (corresponding to its orientation as digitized from the film strip). Once all control information relative to the image has been defined, both the digitized image and its header file are written to a portable storage medium, such as a write once optical compact disc. When the disc is inserted into a playback device (CD player) for driving an output display such as a color TV monitor, the playback device decodes the presentation control information in the course of reading out the digitized image, so that the image will be displayed in an upright orientation.

As explained above, because the storage and retrieval scheme of the present invention employs a playback frame store the capacity of which is less than the digitized image resolution, a prescribed decimation/interpolation operator is employed in the course of interfacing imagery data between the compact disc and the frame store.

Pursuant to a preferred embodiment of the present invention, the reduced capacity frame store has a (512×512) luminance storage capacity which is less than the resolution of the 768×512 pixel array of the base image. A 'boundary address' image window is centered within the (512×512) array of pixels associated with the respective storage locations of the frame store to define which pixels may be used to form an output or reproduction image.

In response to the contents of a presentation file being representative of a vertical image, a (384×256) luminance image is read from the disc, and data values for the vertical dimension of that interlaced image field are interpolated, so as to effectively increase its vertical-to-horizontal aspect ratio. The resulting increased vertical-to-horizontal aspect ratio image is written into the frame store in such a manner as to effectively produce an orthogonal rotation of the increased vertical-to-horizontal aspect ratio image.

When accessing the contents of the frame store to drive an associated reproduction device such as a TV display, those interpolated image values that fall within the address boundary window are accessed and coupled to the image reproduction device (TV display).

On the other hand, when the presentation file identifies a horizontal imagery data file, the entire 768×512 base resolution luminance imagery data file is read out from the disc.

In order to store the 768×512 file in the (512×512) luminance frame store, data values for the horizontal dimension of the 768×512 pixel array are decimated, so as to effectively decrease its horizontal-to-vertical aspect ratio. Those image values that fall within the address boundary window are then read out and coupled to the image reproduction device (e.g. TV monitor).

As in the above-referenced Parulski et al application, the playback device may also employ a border generator to controllably 'frame' or crop a played back image.

DETAILED DESCRIPTION

Before describing in detail the particular improved digital image storage and retrieval mechanism in accordance with the present invention, it should be observed that the present invention resides primarily in a novel structural combination of conventional signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

FIG. 1 diagrammatically illustrates a photographic color film processing system (photofinishing minilab) with which the present invention may be employed and, as pointed out above, for purposes of the present description such a system may be of the type described in co-pending patent application Ser. No. 582,305, filed Sep. 14, 1990, by S. Kristy entitled "Multi-resolution Digital Imagery Photofinishing System, " now U.S. Pat. No. 5,218,455, issued Jun. 8, 1993, assigned to the assignee of the present application and the disclosure of which is herein incorporated. It should be observed that the system described in the co-pending Kristy application is merely an example of one type of system in which the invention may be used and is not to be considered limitative of the invention. In general, the invention may be incorporated in any digitized imagery processing system.

In accordance with the digital image processing system of FIG. 1, photographic images, such as a set of twenty-four or thirty-six 36 mm×24 mm image frames of a 35 mm film strip 10, are scanned by an opto-electronic film scanner 12, such as the previously referenced, commercially available Eikonix 1435 high resolution scanner. Scanner 12 outputs digitally encoded data representative of the internal electronic scanning of a high resolution imaging sensor pixel array (e.g. a 3072×2048 pixel matrix) onto which a respective photographic image frame of film strip 10 is projected. This digitally encoded data, or 'digitized' image, is coupled in the form of an imaging pixel array-representative bit map to an attendant image processing workstation 14, which contains a frame store and image processing application software through which the digitized image may be processed (e.g. enlarged, cropped, subjected to a scene balance correction mechanism, etc.) to achieve a desired base image appearance and configuration. Once image file has been prepared, it is stored on a transportable medium, such as an optical compact disc 15, using an optical compact disc recorder 16, for subsequent playback on playback device (CD player) 20 to drive a reproduction device, for example a consumer television set 22 or thermal printer 24.

In accordance with the imagery data processing system described in the above referenced Kristy patent, each high resolution captured image is stored as a respective image data file containing a low, or base resolution (768×512) luminance image bit map file, a plurality of higher resolution residual images associated with respectively increasing degrees of image resolution, and a 384×256 luminance-hierarchical lower resolution image. By iteratively combining the higher resolution residual images with the base resolution image, successively increased resolution images may be recovered from the base resolution image.

As an example, spatial data values representative of a high resolution (3K×2K) image scan of a 36 mm-by-24 mm image frame of a 35 mm film strip 10 may be stored as a respective image data file including a base resolution image bit map file containing data values associated with a spatial image array or matrix of 512 rows and 768 columns of pixels and an associated set of residual image files to be stored on the disc. Within the workstation itself, the base resolution image may be further sub-sampled to derive an even lower resolution sub-array of image values (e.g. on the order of 192×128 pixels) for display on a segment of the system operator's workstation for the purpose of identifying image orientation.

As pointed out above and as described in the above-referenced co-pending Parulski application, a presentation information file is associated with each digitized image for the purpose of specifying how the image was captured on film and has been correspondingly digitized and stored on disc, so that, when played back, the image will have an upright orientation and the correct aspect ratio for the display device.

Figure 2:
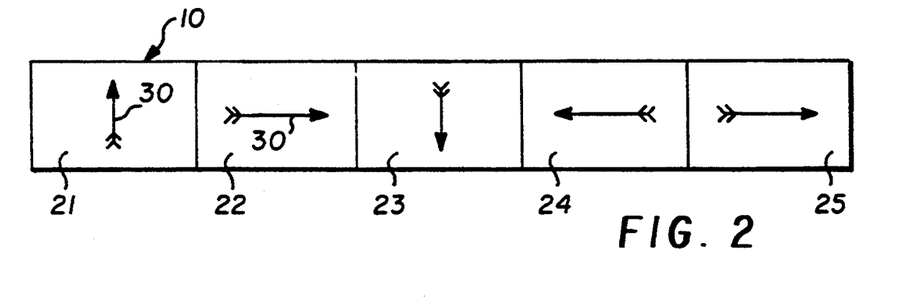
FIG. 2 diagrammatically illustrates a portion of a film strip that contains a plurality of successive image frames on each of which an image of an arrow has been recorded.

FIG. 2 diagrammatically illustrates a portion of a film strip 10 that contains a plurality of successive image frames 21 . . . 25, on each of which an image of an arrow 30 has been recorded. While not every strip of film will necessarily contain images at each of the orientations shown in FIG. 2, a typical film strip can be expected to include both horizontally-shot (whether upright or inverted) and vertically-shot (either right or left hand rotation) images. In frame 21 the arrow has been recorded with the camera held by the photographer in its normal horizontal position. In frame 22 the arrow has been recorded with the camera held by the photographer in its normal vertical position, rotated counter-clockwise 90° relative to its normal horizontal position. In frame 23 the arrow has been recorded with the camera held by the photographer in its flipped (or inverted) horizontal position, rotated 180° relative to its normal horizontal position. In frame 24 the arrow has been recorded with the camera held by the photographer in its flipped vertical position, rotated clockwise 90° relative to its normal horizontal position. In frame 25 the arrow has been recorded with the camera held by the photographer in its normal vertical position.

Each image on the film strip is scanned and digitized as though it were horizontally oriented, irrespective of its actual orientation on the film. The digitized image is then stored in the workstation's frame store, as is, and a lower resolution version of the digitized image is then displayed on the display monitor of workstation 14, so that the image may be viewed by the operator. Then, as each image is digitized and stored, the photofinishing minilab operator, using a workstation input device (e.g. keyboard, mouse) enters a set of 'presentation' control codes that are incorporated within a presentation information file associated with a respective image file.

Figure 3:
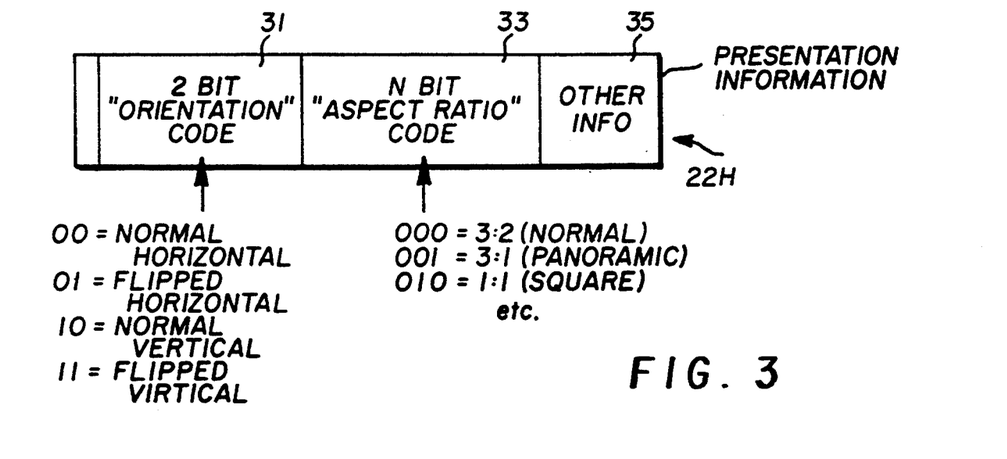
FIG. 3 shows the format of a presentation information file.

The format of the presentation information is shown in FIG. 3 as comprising an M-bit orientation field 31, an N-bit aspect ration field 33, and a supplemental field 35, in which additional information, such as title, date, etc. may be inserted by the operator in the course of formatting a digitized image for storage on the disc. For the four possible image orientations described above and depicted in FIG. 2, M=3 bits are required for the orientation field 31. For the N-bit aspect ratio field 33, three bits are shown by way of example. It should be observed that the parameters and field formats given here are merely for purposes of illustration and are not to be considered limitative of the invention. As in any data processing application what is required is that the actual coding structure and data format of the header field be capable of being read and interpreted by the underlying control mechanism in the playback device. Rather than describe the coding details of that mechanism, the description to follow will set forth the architecture of the storage and retrieval mechanism and the manner in which it processes images having both horizontal and vertical orientations.

Figure 4:
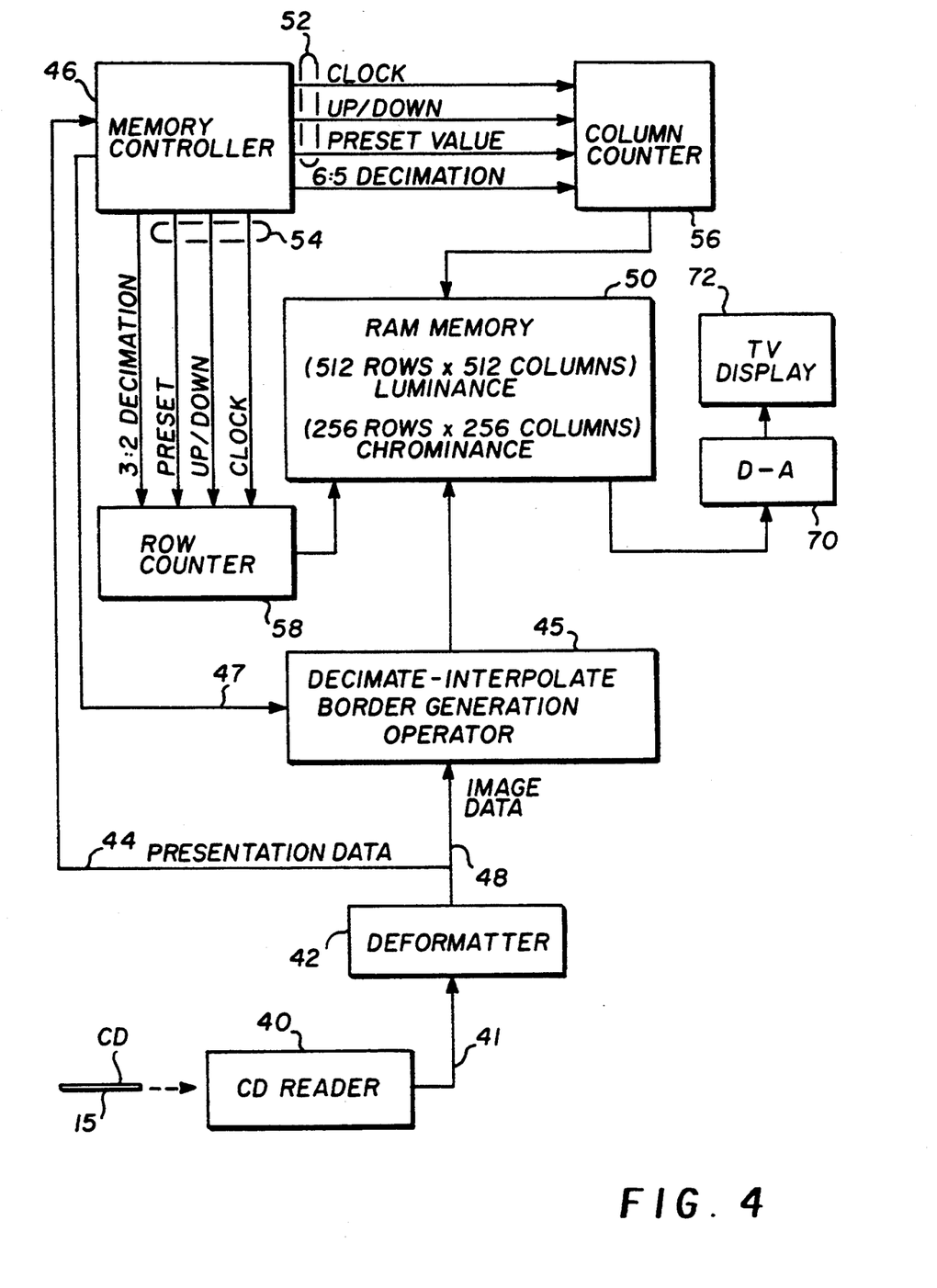
FIG. 4 diagrammatically illustrates the signal processing architecture of an image retrieval mechanism in accordance with the present invention.

FIG. 4 diagrammatically illustrates the signal processing architecture of an image retrieval mechanism in accordance with an embodiment of the present invention, which may be incorporated in a commercially available digital data storage and retrieval device, such as a compact disc player, for supplying image generation control signals to an associated display device, such as a color television monitor. As shown in the figure, data read by a CD reader 40 from a disc 15 is coupled over input bus 41 to a deformatter 42, which separates the presentation information from the (768×512) imagery array field. The presentation information data field is coupled over link 44 to a memory controller 46, while the imagery data is coupled over link 48 to a selectively enabled decimation/interpolation and border generation (dec/int/bg) operator 45. Operator 45 is controllably enabled, via link 47 from memory controller 46 to effect a 3:2 decimation of respective lines of a 768×512 frame of imagery data for horizontal images, and a 2:3 interpolation of respective lines of a 384×256 sub-frame of imagery data for vertical images, and generates the appropriate border information.

For this purpose, operator 45 contains a zero insertion circuit cascaded with a digital convolution filter, and operates to fill in zeros at those pixel locations where a border image is to be produced. As a result, a prescribed number of input pixel values per line (e.g. 768 for a horizontal image or 384 for a vertical image) are converted into a predetermined number of output pixels per line (e.g. 512 for a horizontal image and 576 for a vertical image). The output of operator 45 is coupled over link 49 to a frame store (random access memory) 50, the storage capacity of which is less than the 768×512 resolution of the luminance base image file stored on the disc and preferably corresponds to a 'square' frame of imagery data (e.g. an array of 512×512 luminance pixels). Thus, for a three color space/pixel value scheme quantized to eight bits per pixel, the 576 Kbyte requirements of a 768×512 luminance and 384×256 chrominance frame store are reduced to 384 Kbytes.

Memory controller 46, which controls the clocking of imagery data from disc 15 into frame store 50 may be incorporated as part of the CD player's microcontroller or may be a separate dedicated combinational logic circuit driven by the microcontroller for controlling the generation of address/clock signals which are supplied over respective address bus links 52 and 54 to a set of associated column and address counters 56 and 58, respectively, for controlling the rate and order in which addresses of memory 50 are accessed.

As pointed out previously, each field of imagery data is stored and read from the disc 15 as though the image were a normal 768×512 pixel horizontal image. The manner in which the imagery data is downloaded from the disc and written into frame store 50 will depend upon its associated presentation information data, which includes an orientation code (31, FIG. 3) specifying whether the image is a horizontal image or a vertical image. For horizontal images, memory controller 46 enables operator 45 to effect a 3:2 decimation of each line of 768 values down to 512 values, thereby effectively converting the 768×512 base resolution image into a 512×512 image, data values for which are stored in the 512×512 address memory locations of frame store 50, as illustrated in the process flow diagram of FIG. 5.

When imagery data is read out from memory 50, it is coupled over link 60 to a digital-to-analog converter 70 for application to a display device, such as a color TV monitor 72, so that a reproduction of the original 35 mm image will be presented to the viewer.

The manner in which memory controller 46 controls the generation of address signals for loading data from the disc into the frame store will be described below with reference to FIGS. 6 and 7.

Figure 5:
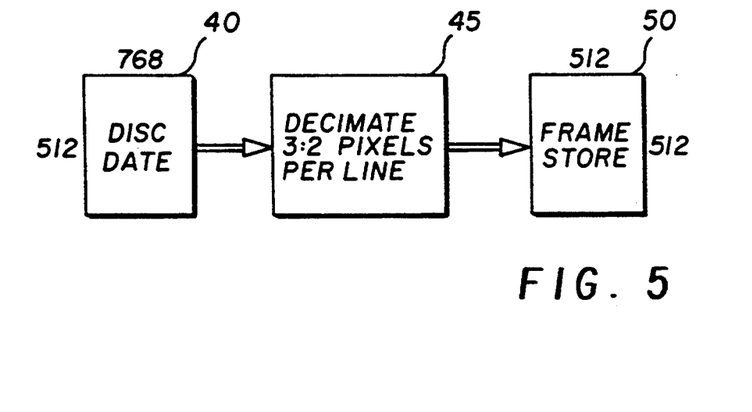
FIG. 5 is a memory load process flow diagram for horizontal images.
Figure 6:
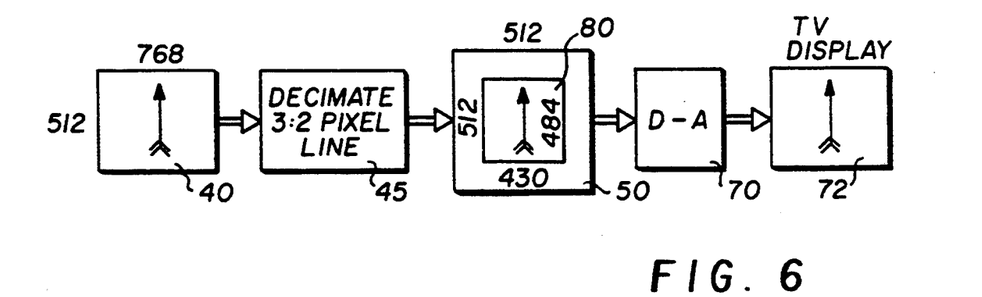
FIG. 6 illustrates the process flow through which memory controller controls the generation of address signals for loading data from the disc into the frame store and for reading out data from the frame store for application to an NTSC system television monitor for a 'horizontal' image.

More particularly, FIG. 6 illustrates a frame store load, or write-in, processing sequence for normal 'horizontal' images depicted in FIG. 5 and an overlay of a rectangular 'address boundary' window 80 'centered' on the 512×512 pixel array represented by the contents of frame store 50. For an inverted horizontal image, the same window of addresses is accessed except that the order of read-out of the successive 484 lines is reversed from that of a normal horizontal image.

Figure 7:
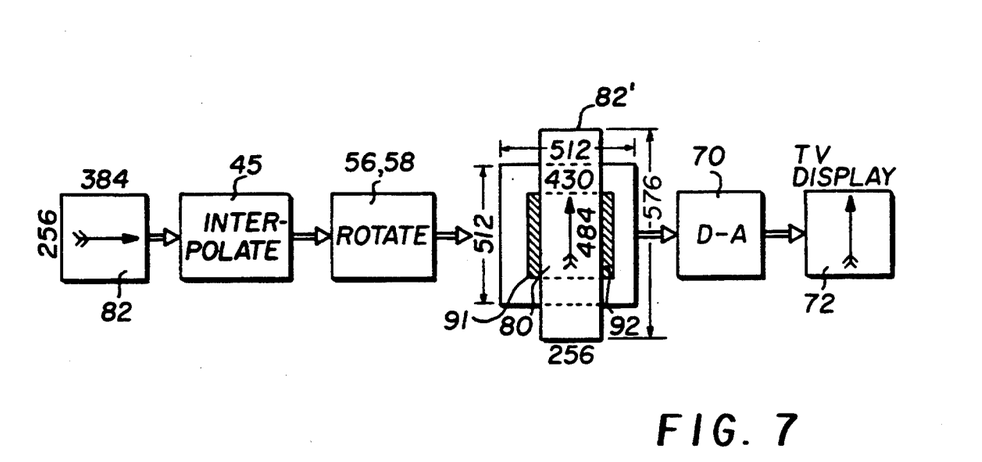
FIG. 7 illustrates the process flow through which memory controller controls the generation of address signals for loading data from the disc into the frame store and for reading out data from the frame store for application to an NTSC system television monitor for a 'vertical' image.

FIG. 7 illustrates a frame store load processing sequence for normal 'vertical' images, together with an overlay of a rectangular address boundary window 80 centered on the 512×512 pixel array represented by the contents of frame store 50.

More particularly, as described previously, when a vertical imagery data file is accessed from the disc, only one of its four 384×256 interlaced image fields of which its 768×512 base resolution image file is comprised is read out from the disc. One of these files is diagrammatically shown in FIG. 7 as a 384×256 pixel image 82. Because the data file is that of a vertically oriented image, the image is effectively rotated by controllably 'swapping' the inputs to column and row counters 56 and 58 during the strobing of the address inputs of frame store 50. When the image field (which undergoes a 90° rotation as a result of the swapping the inputs to address counters 56 and 58) is loaded into frame store 50, it is effectively centered relative to address boundary window 80, so that there is a small amount of cropping of the image at a top portion 85 and a bottom portion 86. For an inverted vertical image the same 576×256 data values are used except that the order of write-in of the successive 576 lines is reversed from that of a normal vertical image.

Because the imagery data stored in frame store 50 has undergone a 90° rotation prior to the 2:3 interpolation of the vertical dimension of the image in the course of loading the vertical image file into frame store 50, the effective vertical:horizontal aspect ratio of the stored image is 9:4.

As will be appreciated from the foregoing description of the present invention, the size and cost of the digitized imagery data storage and retrieval scheme disclosed in the above-referenced Parulski et al application can be reduced by the use of a playback frame store that has both a smaller capacity and employs a common address clock for both horizontal and vertical scans of memory. Since the playback mechanism uses a frame store the storage capacity of which corresponds to a 'square' pixel array (e.g. a 512×512 pixel resolution), the same address clock can be used for both pixel and line scans. To accommodate the differences between the memory capacity and the disc and display resolutions, during memory write operations, imagery data values are controllably subjected to an interpolation/decimation operator.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a digitized image processing system in which images that have been captured on an image recording medium are converted into digital format and stored as digitized image data files on a transportable digital data storage medium, a method of controlling the manner in which digitized images are accessed therefrom for storage comprising the steps of:

(a) causing a digital data recording device to store, on said transportable digital data storage medium, respective data files associated with each of the images that have been digitized from images captured on said image recording medium, each of said data files containing digitized imagery data representative of its associated image as captured on said image recording medium;

(b) for each of said respective data files, causing said digital data recording device to store, on said transportable digital data storage medium, a presentation file, the contents of which represent the manner in which its associated digitized imagery data has been captured, on said image recording medium;

(c) providing an image retrieval device, which contains a digital data memory having a storage capacity which is different from the resolution of the image represented by the contents of a digitized image data file stored on said transportable digital data storage medium;

(d) transporting said transportable digital data storage medium on which digital data files and presentation files have been stored in steps (a) and (b) to said image retrieval device and coupling said transportable digital data storage medium to said image retrieval device; and (e) causing said image retrieval device to read out, from said transportable digital data storage medium, the digitized imagery data of a respective data file stored in step (a) and to write the read out digitized imagery data into said digital data memory of said image retrieval device in a manner that depends upon the contents of its associated presentation file stored on said transportable digital data storage medium in step (b).

2. A method according to claim 1, wherein said image retrieval device is coupled to an image reproduction device and further comprising the step of:
  (f) controllably causing said image retrieval device to read out digitized imagery data that has been written into said digital data memory and to couple the read out data to said image reproduction device such that the reproduced image is reproduced by said image reproduction device in an upright orientation.

3. A method according to claim 1, wherein the digitized image of a respective image file corresponds to an MXN array of pixels and said digital data memory has a storage capacity associated with an MXP array of pixels, where P is less than N.

4. A method according to claim 2, wherein the resolution of said reproduction device is different than the storage capacity of said digital data memory.

5. A method according to claim 2, wherein the resolution of said reproduction device is greater than the storage capacity of said digital data memory.

6. A method according to claim 1, wherein step (e) comprises causing said image retrieval device to controllably decimate digitized image data stored on said transportable digital data storage medium that has been coupled thereto and to write the decimated data into said digital data memory.

7. A method according to claim 1, wherein step (e) comprises causing said image retrieval device to controllably interpolate digitized image data stored on said transportable digital data storage medium that has been coupled thereto and to write the interpolated data into said digital data memory.

8. A method according to claim 2, wherein step (e) comprises controllably causing said image retrieval device to decimate or interpolate digitized image data stored on said transportable digital data storage medium that has been coupled thereto and to write the decimated or interpolated data into said digital data memory of said image retrieval device.

9. A method according to claim 1, wherein step (e) comprises, in response the contents of said presentation file indicating that said image has a first orientation, controllably causing said image retrieval device to decimate a first portion of the digitized image data stored on said transportable digital data storage medium and to write the decimated image data from said transportable digital data storage medium into said digital data memory of said image retrieval device.

10. A method according to claim 9, wherein step (e) comprises, in response the contents of said presentation file indicating that said image has a second orientation, controllably causing said image retrieval device to interpolate a second portion of the digitized image data stored on said transportable digital data storage medium and to write the interpolated image data into said digital data memory of said image retrieval device.

11. A method according to claim 1, wherein step (b) comprises causing said digital data recording device to store, within a respective presentation file, first data representative of the orientation of its associated image as captured on said image recording medium.

12. A method according to claim 2, wherein said image reproduction device comprises a television display.

13. A method according to claim 1, wherein said transportable digital data storage medium comprises a photo compact disc and said image retrieval device comprises a photo compact disc player.

14. A method according to claim 1, wherein step (e) comprises causing said image retrieval device to write digitized imagery data into said digital data memory using a common clock for both pixel and line scan directions of a digital image.

15. A method according to claim 14, wherein said step (f) comprises causing said image retrieval device to read digitized imagery data from said digital data memory using a common clock for both pixel and line scan directions of a digital image.

16. A method according to claim 2, wherein said digital data memory has a capacity of an equal number of lines of pixels and pixels per line of a digital image storable therein, and wherein each of steps (e) and (f) comprises causing said image retrieval device to access said digital data memory using a common clock for both pixel and line scan directions.

17. For use with a digital image processing system wherein a plurality of images that have been captured on a photographic recording medium, said images being (and may include horizontally and vertically oriented images) oriented along one of a plurality of orientation axes, including vertical and horizontal axes, said images being (, are) digitized into respective digital imagery data files, each digital imagery data file containing data values associated with an array of pixels corresponding to a prescribed resolution representation of a respective one of said plurality of images, a method of controlling (the manner in which said) access to said digital imagery data files (may be accessed) for storage comprising the steps of:
  (a) digitizing each of said plurality of images in accordance with a prescribed orientation, irrespective of its actual orientation on said photographic recording medium, and causing a digital data recording device to store each digitized image in a respective digital imagery data file on a transportable digital data storage medium;
  (b) for each digital imagery data file stored in step (a), causing said digital data recording device to store on said transportable digital data storage medium a presentation data file, the contents of which are associated with the actual orientation of its image on said photographic recording medium;
  (c) providing a digital image retrieval device having a digital data memory, the storage capacity of which is different from the resolution of the image represented by the contents of a digitized image data file stored on said transportable digital data storage medium;
  (d) transporting said transportable digital data storage medium on which digital data files and presentation files have been stored in steps (a) and (b) to said image retrieval device and coupling said transportable digital data storage medium to said image retrieval device; and
  (e) causing said image retrieval device to read out, from said transportable digital data storage medium that has been coupled to said image retrieval device, the digitized imagery data of a respective data file stored in step (a) and to write the read out digitized imagery data into said digital data memory, in a manner that depends upon the contents of its associated presentation file stored in step (b).

18. A method according to claim 17, further comprising the step of:
(f) causing said image retrieval device to controllably read out digitized imagery data that has been written into said digital data memory and to couple the read out data to an image reproduction device such that the reproduced image is reproduced by said image reproduction device in an upright orientation.

19. A method according to claim 17, wherein said transportable digital data storage medium comprises a photo compact disc and said digital image retrieval device comprises a photo compact disc player.

20. A method according to claim 17, wherein step (e) comprises causing said image retrieval device to write digitized imagery data into said digital data memory using a common clock for both pixel and line scan directions of a digital image.

21. A method according to claim 20, wherein said step (f) comprises causing said image retrieval device to read digitized imagery data from said digital data memory using a common clock for both pixel and line scan directions of a digital image.

22. A method according to claim 18, wherein said digital data memory has a capacity of an equal number of lines of pixels and pixels per line of a digital image storable therein, and wherein each of steps (e) and (f) comprises causing said image retrieval device to access said digital data memory using a common clock for both pixel and line scan directions.

23. For use with a digital image processing system wherein a plurality of photographic images that have been captured on a photographic recording medium are digitized and stored on a transportable digital data storage medium, said transportable digital data storage medium being capable of being coupled to an image playback device for display of an image, a method of controlling the displayed presentation of said image by said playback device comprising the steps of:
(a) digitizing each of said plurality of images on said photographic recording medium and storing each digitized image on said transportable digital data storage medium in the orientation in which the image was captured on said photographic recording medium;
(b) for each digitized image stored in step (a), causing a digital data recording device to store on said transportable digital data storage medium at least one digital code respectively representative of the orientation of the image;
(c) providing, with said image playback device, a digital data memory(,) having a (the) storage capacity (of) which is different from the resolution of the image represented by the contents of a digitized image stored on said transportable digital data storage medium;
(d) transporting said transportable digital data storage (device) medium to said image playback device;
(e) causing said image playback device to read out, from said transportable digital data storage medium that has been transported thereto in step (d), a respective digitized image stored in step (a) and to write the read out digitized image into said digital data memory in a manner that depends upon the contents of its associated at least one digital code stored in step (b); and
(f) causing said image playback device to read out a digitized image that has been written into said digital data memory and to couple the read out digitized image to an image reproduction device such that the reproduced image is reproduced by said image reproduction device in an upright orientation.

24. A method according to claim 23, wherein said transportable digital data storage medium comprises a photo compact disc and said image playback device comprises a photo compact disc player.

25. A method according to claim 23, wherein step (e) comprises causing said image playback device to write digitized imagery data into said digital data memory using a common clock for both pixel and line scan directions of a digital image.

26. A method according to claim 25, wherein said step (f) comprises causing said image playback device to read digitized imagery data from said digital data memory using a common clock for both pixel and line scan directions of a digital image.

27. A method according to claim 23, wherein said digital data memory has a capacity of an equal number of lines of pixels and pixels per line of a digital image storable therein, and wherein each of steps (e) and (f) comprises causing said image playback device to access said digital data memory using a common clock for both pixel and line scan directions.

28. For use with a digital image processing system wherein a plurality of images that have been captured on a photographic recording medium, said images being (and may include horizontally and vertically oriented images, are) oriented along one of a plurality of orientation axes, including vertical and horizontal axes, Said images being digitized into respective digital imagery data files and stored on a transportable digital data storage medium, each digital imagery data file containing a base resolution image associated with an MXN pixel array and formatted as a plurality of interlaced image fields each of which is associated with a respective JXK pixel subarray within said MXN pixel array, a method of controlling (the manner in which) access to a digital imagery data file (may be accessed) for application to an image reproduction device, so that a reproduced image (may be) is capable of being viewed in an upright orientation comprising the steps of:
(a) causing a digital data recording device to store, within each of said data files, digitized imagery data representative of its associated image as captured on said (image) photographic recording medium;
(b) for each respective data file, causing said digital data recording device to store, on said transportable digital data storage medium, a presentation file the contents of which represent the manner in which its associated digitized imagery data has been captured on said photographic recording medium;
(c) providing an image retrieval device having a digital data memory(, the) with a storage capacity (of) which is less than the resolution of said MXN pixel array, but greater than the resolution of said JXK pixel sub-array;
(d) transporting said transportable digital data storage medium and coupling said transportable digital data storage medium with said image retrieval device;

(e) defining an image window within the array of pixels associated with the respective storage locations of said digital data memory;

(f) for a vertical imagery data file, causing said image retrieval device to read out, from said transportable digital data storage medium, digitized image data associated with one of its interlaced image fields, to interpolate data values for the vertical dimension of said one interlaced image field so as to effectively increase its vertical-to-horizontal aspect ratio, and to store the (resulting) increased vertical-to-horizontal aspect ratio of said one interlaced image field in storage locations of said digital data memory that effectively produce an orthogonal rotation of said increased vertical-to-horizontal aspect ratio interlaced image field; and (g) causing said image retrieval device to read out from said digital data memory those image values stored in step (f) that fall within said image window and to couple the read-out image to said image reproduction device, such that the read-out image is reproduced by said image reproduction device in an upright orientation.

29. A method according to claim 28, wherein said transportable digital data storage medium comprises a photo compact disc and said image retrieval device comprises a photo compact disc player.

30. A method according to claim 28, wherein step (f) comprises causing said image retrieval device to write digitized imagery data into said digital data memory using a common clock for both pixel and line scan directions of a digital image.

31. A method according to claim 30, wherein said step (g) comprises causing said image retrieval device to read digitized imagery data from said digital data memory using a common clock for both pixel and line scan directions of a digital image.

32. A method according to claim 28, wherein said digital data memory has a capacity of an equal number of lines of pixels and pixels per line of a digital image storable therein, and wherein each of steps (f) and (g) comprises causing said image retrieval device to access said digital data memory using a common clock for both pixel and line scan directions.

33. For use with a digital image processing system wherein a plurality of images that have been captured on a photographic recording medium, said images being (and may include horizontally and vertically oriented images,) oriented along one of a plurality of orientation axes, including vertical and horizontal axes, said images being (are) digitized into respective digital imagery data files and stored on a transportable digital data storage medium, each digital imagery data file containing a base resolution image associated with an MXN pixel array, a method of controlling (the manner in which) access to a digital imagery data file (may be accessed) for application to an image reproduction device, so that a reproduced image (may be) is capable of being viewed in an upright orientation comprising the steps of:

(a) causing a digital data storage device to store on said transportable digital data storage medium, within each of said data files, digitized imagery data representative of its associated image as captured on said photographic recording medium;

(b) for each respective data file, causing said digital data storage device to store, on said transportable digital data storage medium, a presentation file the contents of which represent the manner in which its associated digitized imagery data has been captured on said (image recording) transportable digital data storage medium;

(c) providing an image retrieval device having a digital data memory(, the) with a storage capacity (of) which is less than the resolution of said MXN pixel array;

(d) transporting said transportable digital data storage medium and coupling said transportable digital data storage (device) medium to said image retrieval device;

(e) defining an image window within the array of pixels associated with the respective storage locations of said digital data memory;

(f) for a horizontal imagery data file, causing said image retrieval device to read out, from said transportable digital data storage medium that has been coupled thereto, digitized image data associated with said MXN pixel array, to decimate data values for the horizontal dimension of said MXN pixel array so as to effectively decrease its horizontal-to-vertical aspect ratio, and to store the (resulting) decreased horizontal-to-vertical aspect ratio (image) in storage locations of said digital data memory; and (f) causing said image retrieval device to read out from said digital data memory those image values stored in step (f) that fall within said image window and to couple the read-out image to said image reproduction device.

34. A method according to claim 33, wherein said transportable digital data storage medium comprises a photo compact disc and said image retrieval device comprises a photo compact disc player.

35. A method according to claim 33, wherein step (f) comprises causing said image retrieval device to write digitized imagery data into said digital data memory using a common clock for both pixel and line scan directions of a digital image.

36. A method according to claim 35, wherein said step (g) comprises causing said image retrieval device to read digitized imagery data from said digital data memory using a common clock for both pixel and line scan directions of a digital image.

37. A method according to claim 33, wherein said digital data memory has a capacity of an equal number of lines of pixels and pixels per line of a digital image storable therein, and wherein each of steps (f) and (g) comprises causing said image retrieval device to access said digital data memory using a common clock for both pixel and line scan directions.

38. For use with a digitized image processing system in which images that have been captured on an image recording medium are converted into digital format and stored as digitized image data files on a transportable digital data storage medium, an apparatus for controlling the manner in which digitized images are accessed therefrom for playback comprising, in combination:

a digitized image recording device, which is operative to store, on said transportable digital data storage medium, respective data files associated with each of the images that have been digitized from images captured on said (transportable) image recording medium, each of said data files containing digitized imagery data representative of its associated image as captured on said image recording medium, and a presentation file for each of said respective data files, the contents of said presentation file being representative of (the manner in which) its associated digitized imagery data (has been) as captured on said image recording medium and stored as a digitized image on said transportable digital data storage medium; and a playback device including a digital data memory, the storage capacity of which is different from the resolution of the image represented by the contents of a digitized image data file stored on said digital data storage medium, and being operative to read from said transportable digital data storage medium, that has been transported from said digitized image recording device and coupled to said playback device, the digitized imagery data of a respective data file and writes the read out digitized imagery data from said transportable digital data storage medium into said digital data memory in a manner that depends upon the contents of its associated presentation file, and controllably reads digitized imagery data that has been written into said memory and couples the read out data to an image reproduction device such that the reproduced image is reproduced by said image reproduction device in an upright orientation.

39. An apparatus according to claim 38, wherein the digitized image of a respective image file corresponds to an MXN array of pixels and said digital data memory has a storage capacity associated with an MXP array of pixels, where P is less than N.

40. An apparatus according to claim 38, wherein the resolution of said reproduction device is greater than the storage capacity of said digital data memory.

41. An apparatus according to claim 38, wherein said playback device is operative to controllably decimate digitized image data stored on said transportable digital data storage medium that has been coupled thereto and to write the decimated data into said digital data memory.

42. An apparatus according to claim 38, wherein said playback device is operative to controllable interpolate digitized image data stored on said transportable digital data storage medium that has been coupled thereto and to write the interpolated data into said digital data memory.

43. An apparatus according to claim 38, wherein said playback device is operative, in response to the contents of said presentation file indicating that said image has a first orientation, to controllably decimate a first portion of the digitized image data stored on said transportable digital data storage medium and to write the decimated image data into said digital data memory.

44. An apparatus according to claim 38, wherein said digitized image recording device is operative to store, within a respective presentation file, first data representative of the orientation of its associated image as stored on (transportable) said transportable digital data storage medium.

45. An apparatus according to claim 44, wherein said image reproduction device comprises a television display.

46. An apparatus according to claim 45, wherein said television display contains an array of pixels the resolution of which is greater than the resolution of a respective data file.

47. An apparatus according to claim 38, wherein said transportable digital data storage medium comprises a photo compact disc and said playback device comprises a photo compact disc player.

48. A method according to claim 38, wherein step (f) comprises causing said image retrieval device to write digitized imagery data into said digital data memory using a common clock for both pixel and line scan directions of a digital image.

49. A method according to claim 48, wherein said step (g) comprises causing said image retrieval device to read digitized imagery data from said digital data memory using a common clock for both pixel and line scan directions of a digital image.

50. A method according to claim 38, wherein said digital data memory has a capacity of an equal number of lines of pixels and pixels per line of a digital image storable therein, and wherein each of steps (f) and (g) comprises causing said image retrieval device to access said digital data memory using a common clock for both pixel and line scan directions.

51. For use with a digital image processing system wherein a plurality of images that have been captured on a photographic recording medium, said images being (and may include horizontally and vertically oriented images) oriented along one of a plurality of orientation axes, including vertical and horizontal axes, said images being (, are) digitized into respective digital imagery data files, each digital imagery data file containing data values associated with an array of pixels corresponding to a prescribed resolution representation of a respective one of said plurality of images, an apparatus for controlling (the manner in which said) access to said digital imagery data files (may be accessed) for presentation to a reproduction device, so that a reproduced image (may be) is capable of being viewed in an upright orientation comprising, in combination:

a digitized image recording device which is operative to digitize each of said plurality of images in accordance with a prescribed orientation, irrespective of its actual orientation on said photographic recording medium, and stores each digitized image in a respective digital imagery data file on a transportable digital data storage medium and stores on said transportable digital data storage medium, for each digital imagery data file, a presentation data file the contents of which are associated with the actual orientation of its image on said photographic recording medium; and a playback device including a digital data memory having a storage capacity which is different from the resolution of the image represented by the contents of a digitized image data file stored on said transportable digital data storage medium, said playback device being operative to read out, from said transportable digital data storage medium, the digitized imagery data of a respective data file and to write the read out digitized imagery data into said digital data memory in a manner that depends upon the contents of its associated presentation file, and to controllably read out digitized imagery data that has been written into said digital data memory and to couple the read out data to said image reproduction device such that the reproduced image is reproduced by said image reproduction device in an upright orientation.

52. An apparatus according to claim 51, wherein said transportable digital data storage medium comprises a photo compact disc and said playback device comprises a photo compact disc player.

53. An apparatus according to claim 51, wherein said playback device is operative to write digitized imagery data into said digital data memory using a common clock for both pixel and line scan directions of a digital image.

54. An apparatus according to claim 53, wherein said playback device is operative to read digitized imagery data from said digital data memory using a common clock for both pixel and line scan directions of a digital image.

55. An apparatus according to claim 51, wherein said digital data memory has a capacity of an equal number of lines of pixels and pixels per line of a digital image storable therein, and wherein said playback device is operative to access said digital data memory using a common clock for both pixel and line scan directions.

56. For use with a digital image processing system wherein a plurality of photographic images that have been captured on a photographic recording medium are digitized and stored on a transportable digital data storage medium, said transportable digital data storage medium being transported to and coupled to an image playback device for display of an image, an apparatus for controlling the displayed presentation of said image by said playback device comprising, in combination:

a digitized image recording device which is operative to digitize each of said plurality of images on said photographic recording medium and to store each digitized image on said transportable digital data storage medium in the orientation in which the image was captured on said photographic recording medium, and, for each digitized image, to store at least one digital code respectively representative of at least one of the aspect ratio and orientation of the image;

a digitized image playback device including a digital data memory, said digital data memory having a storage capacity which is different from the resolution of the image represented by the contents of a digitized image stored on said transportable digital data storage medium, and is operative to read out, from said transportable digital data storage medium that has been transported from said digitized image recording device and coupled to said digitized image playback device, a respective digitized image and to write the read out digitized image into said digital data memory in a manner that depends upon the contents of its associated at least one digital code, and controllably reads out a digitized image that has been written into said digital data memory and couples the read out digitized image to said image reproduction device such that the reproduced image is reproduced by said image reproduction device in an upright orientation.

57. An apparatus according to claim 56, wherein said transportable digital data storage medium comprises a photo compact disc and said digitized image playback device comprises a photo compact disc player.

58. An apparatus according to claim 56, wherein said digitized image playback device is operative to write digitized imagery data into said digital data memory using a common clock for both pixel and line scan directions of a digital image.

59. An apparatus according to claim 58, wherein said digitized image playback device is operative to read digitized imagery data from said digital data memory using a common clock for both pixel and line scan directions of a digital image.

60. An apparatus according to claim 56, wherein said digital data memory has a capacity of an equal number of lines of pixels and pixels per line of a digital image storable therein, and wherein said digitized image playback device is operative to access said digital data memory using a common clock for both pixel and line scan directions.

61. For use with a digitized image processing system in which images that have been captured on an image recording medium are converted into digital format and stored as digitized image data files on a transportable digital data storage medium, each of said data files containing digitized imagery data representative of its associated image as captured on said image recording medium, and a presentation file for each of said respective data files, the contents of said presentation file being representative of the manner in which its associated digitized imagery data has been captured on said image recording medium and stored as a digitized image on said transportable digital data storage medium, a playback apparatus for controlling (the manner in which) access to said digitized images (are accessed) from said transportable digital data (recording) storage medium for presentation by an image reproduction device comprising, in combination:

a transportable digital data (recording) storage medium interface to which said transportable digital data (recording) storage medium is transported and coupled;

a digital data memory coupled to said transportable digital data (recording) storage medium interface and having a storage capacity which is different from the resolution of the image represented by the contents of a digitized image data file stored on said transportable digital data storage medium that has been transported and coupled to said interface;

first means for reading from said transportable digital data storage medium the digitized imagery data of a respective data file and writing the read out digitized imagery data into said digital data memory in a manner that depends upon the contents of its associated presentation file; and second means for controllably reading out digitized imagery data that has been written into said digital data memory from said transportable digital data storage medium coupled to said interface and coupling the read out data to an image reproduction device such that the reproduced image is reproduced by said image reproduction device in an upright orientation.

62. An apparatus according to claim 61, wherein the digitized image of a respective image file corresponds to an MXN array of pixels and said digital data memory has a storage capacity associated with an MXP array of pixels, where P is less than N.

63. An apparatus according to claim 61, wherein the resolution of said reproduction device is greater than the storage capacity of said digital data memory.

64. An apparatus according to claim 61, wherein said first means includes means for controllably decimating digitized image data stored on said transportable digital data storage medium and writing the decimated data into said digital data memory.

65. An apparatus according to claim 61, wherein said first means includes means for controllably interpolating digitized image data stored on said transportable digital data storage medium and writing the interpolated data into said digital data memory.

66. An apparatus according to claim 61, wherein said first means includes means, responsive to the contents of said presentation file indicating that said image has a first orientation, for controllably decimating a first portion of the digitized image data stored on said transportable digital data storage medium and writing the decimated image data into said digital data memory.

67. An apparatus according to claim 61, wherein said first device includes means, responsive to the contents of said presentation file indicating that said image has a second orientation, for controllably interpolating a second portion of the digitized image data stored on said transportable digital data storage medium and writing the interpolated image data into said digital data memory.

68. A playback apparatus according to claim 61, wherein said transportable digital data storage medium comprises a photo compact disc.

69. An apparatus according to claim 61, wherein said first means includes means for writing digitized imagery data into said digital data memory using a common clock for both pixel and line scan directions of a digital image.

70. An apparatus according to claim 69, wherein said second means includes means for reading digitized imagery data from said digital data memory using a common clock for both pixel and line scan directions of a digital image.

71. An apparatus according to claim 61, wherein said digital data memory has a capacity of an equal number of lines of pixels and pixels per line of a digital image storable therein, and wherein each of said first and second means is operative to access said digital data memory using a common clock for both pixel and line scan directions.

* * * * *